United States Patent [19]

Bando et al.

[11] 3,852,376
[45] Dec. 3, 1974

[54] LOW SHRINKAGE UNSATURATED POLYESTER RESIN COMPOSITIONS CONTAINING GRAFT COPOLYMERS

[75] Inventors: Satoshi Bando; Kazuo Hara; Toshihiko Yoshitake; Takeo Tasaka, all of Kurashiki, Japan

[73] Assignee: Kuraray Co., Ltd., Kurashiki City, Japan

[22] Filed: Jan. 30, 1973

[21] Appl. No.: 328,050

[30] Foreign Application Priority Data
Feb. 3, 1972  Japan............................ 47-12461
Mar. 30, 1972  Japan........................... 47-32340

[52] U.S. Cl. .............................. 260/862, 260/40 R
[51] Int. Cl. ....................... C08f 43/02, C08f 43/08
[58] Field of Search ................................. 260/862

[56] References Cited
UNITED STATES PATENTS

| | | | |
|---|---|---|---|
| 3,227,665 | 1/1966 | Fourcade et al. | 260/862 |
| 3,331,796 | 7/1967 | Gilbert et al. | 260/28.5 |
| 3,551,378 | 12/1970 | Rabenold et al. | 260/40 |
| 3,577,478 | 5/1971 | Thorpe | 260/862 |

Primary Examiner—William H. Short
Assistant Examiner—E. A. Nielsen
Attorney, Agent, or Firm—Sherman & Shalloway

[57] ABSTRACT

A low-shrinkage unsaturated polyester resin composition comprising an unsaturated polyester resin and dispersed therein a powder of a polyolefinic resin graft polymerized with an unsaturated monomer having affinity for said unsaturated polyester resin.

6 Claims, No Drawings

LOW SHRINKAGE UNSATURATED POLYESTER RESIN COMPOSITIONS CONTAINING GRAFT COPOLYMERS

BACKGROUND OF THE INVENTION

This invention relates to low-shrinkage unsaturated polyester resin compositions having excellent properties.

The terminology "unsaturated polyester resin," as used herein is a liquid mixture obtained by dissolving an unsaturated polyester (which frequently is referred to as an unsaturated alkyd) in a cross-linking unsaturated monomer such as styrene, and is meant to be this liquid mixture which has not yet been submitted to a curing treatment. The cured unsaturated polyester resin shaped articles produced by curing the unsaturated polyester resins (UPER) possess excellent properties as well as practical utility. Hence, it is a well-known fact that they are being widely used. However, the unsaturated polyester resins have the drawback that their shrinkage during the curing operation is great. In consequence, when the unsaturated polyester resin is subjected to compression or injection molding using a mold, there is a tendency of the shaped articles becoming warped or cracked. In addition, there arises such troubles as the formation of sink marks, a lack of smoothness of the surface of the shaped articles and the formation of a fiber pattern of glass fibers. As a means of improving on the foregoing deficiency, there has been proposed recently a method of curing the unsaturated polyester resins after mixing them with a thermoplastic resin such as polystyrene or poly(methyl methacrylate). As a result, it is not possible to obtain shaped articles in which there is substantially no shrinkage, and a great improvement has been achieved as far as the above-mentioned difficulties are concerned. However, a serious new problem has arisen in that by this method there is usually the defect that the polymer tends to adhere to the mold. Further, another serious defect that has newly arisen is that it is difficult to obtain uniformly colored shaped articles in the case where a polymer such as poly(methyl methacrylate), is used as the polymer for improving the shrinkage, since in this case nonuniform coloration of the shaped article occurs when the molding and curing of the resin is carried out after incorporating a dye or pigment.

On the other hand, there has been separately developed a technique of producing such materials as prepregmat, sheet molding compound (SMC) and bulk molding compound (BMC), for use in either compression or injection molding. In this case, the fact that a thickening phenomenon takes place when a small amount of a thickener such as magnesium oxide or calcium hydroxide is incorporated in the unsaturated polyester resins is utilized, and the aforesaid thickeners along with fillers, reinforcing fibers, and a curing catalyst are incorporated in the unsaturated polyester resins. These products are now becoming of increasing importance commercially. The reason therefor is that the unsaturated polyester resins have been transformed by the action of the thickener to a product of solid form having no tackiness in the case of the prepregmat, SMC or BMC, with the consequence that, as compared with the conventional unsaturated polyester resins that were liquid and tacky, their handling is much easier. In addition, they have the further advantage that they can be molded more intimately with glass fibers. In the case of these thickener incorporated type unsaturated polyester resins, such as prepregmat, SMC or BMC, they are frequently stored for a prolonged period of time after their manufacture before they are molded and cured. This storage period often extends over a period ranging up to a maximum of several months. Since the property of shrinking during curing that is inherently possessed by the unsaturated polyester resins is inherited intact even in the case of the unsaturated polyester resins incorporated with thickeners, the various troubles that are caused by the great shrinkage during curing, such as hereinbefore indicated, cannot be avoided, unless improvements of some sort or other are made in preventing the shrinkage. One of the methods of preventing the shrinkage is that of incorporating in the prepregmat, SMC or BMC prior to their thickening treatment, a thermoplastic resin as done in the case of the previously described thickener-unincorporated type unsaturated polyester resins. However, this method is troubled with the same shortcomings as those which occurred in the case of the thickener-unincorporated type unsaturated polyester resins, i.e., the adhesion of the resin to the mold and the nonuniformity of coloration when incorporated with a dye or pigment. In addition, the lack of the dispersion stability of the thermoplastic incorporated appears during a long period of storage as a new shortcoming. This lack of dispersion stability or insufficiency of storage stability means that the state of dispersion of the thermoplastic resin in the thickener-incorporated type unsaturated polyester resin becomes aggravated during storage of the prepregmat, SMC or BMC. As a consequence the cross-linking monomer solution of the thermoplastic resin aggregates to become converted into coarse particles or the cross-linking monomer (e.g. styrene) solution of the thermoplastic resin exudes to the surface of the prepregmat, SMC or BMC. When a prepregmat, SMC or BMC in this condition is molded, adhesion of the thermoplastic resin to the surface of the molds takes place. In consequence, the resulting shaped article is so lacking in surface luster and smoothness as to render it of no practical use. Further, when a prepregmat, SMC or BMC incorporated with a dye or pigment is molded and cured, it is impossible to obtain a beautifully and uniformly colored shaped article, since nonuniformity of coloration usually occurs.

Two methods have been suggested previously for reducing the shrinkage of the thickener-incorporated type unsaturated polyester resin and solving the problem of the dispersion stability of the thermoplastic resin therein. One is that of using a polyethylene powder as the shrinkage reducing polymer. This method prevents the shrinkage of the resin and solves the problem of the resin's dispersion stability during prolonged periods of storage. However, owing to the poor compatibility between the unsaturated polyester resin and polyethylene, the polyethylene exudes to the surface of the cured resin during the curing operation, with the consequence that only shaped articles lacking in surface luster and smoothness can be obtained. Further, there is also nonuniform coloration of the product. The second method suggested is that which uses as the shrinkage reducing polymer a thermoplastic resin having an acid radical (e.g., a copolymer of methyl methacrylate and acrylic acid), which is soluble in the cross-linking monomer (e.g. styrene). While this second method has been quite successful in achieving the prevention of shrinkage and improving the dispersion stability of the thermoplastic resin, it is not a satisfactory method, since the nonuniformity of coloration is pronounced with this method.

SUMMARY OF THE INVENTION

An object of the present invention is to provide a low-shrinkage unsaturated polyester resin composition in which not only the shrinkage is low during the curing operation, but also adhesion to the mold does not take place during the molding operation, with the consequence that shaped articles excelling in smoothness and luster are provided. Another object is to provide a low-shrinkage unsaturated polyester composition which provides uniformly colored shaped articles when incorporated with dyes or pigments. A further object of the invention is to provide a low-shrinkage unsaturated polyester resin composition of the thickener-incorporated type in which the dispersion stability of the thermoplastic resin contained in the low-shrinkage prepregmat, SMC or BMC, which are obtained by the addition of thickener to the low-shrinkage unsaturated polyester resins, is improved, as well as in which such problems as the exudation, adhesion to the mold and nonuniformity of coloration of the low-shrinkage resins are all solved.

According to the present invention, there is provided a low-shrinkage unsaturated polyester resin composition comprising an unsaturated polyester resin and dispersed therein a powder of a polyolefinic resin graft polymerized with an unsaturated monomer having an affinity for said unsaturated polyester resin. While the unsaturated polyester resin composition may or may not contain a thickner, the unexpected function or effects are manifested much more conspicuously when a thickener is included.

DESCRIPTION OF THE PREFERRED EMBODIMENTS

The unsaturated polyesters, i.e., unsaturated alkyds, used in the present invention are those prepared from the aromatic saturated dibasic acids, alpha, beta-unsaturated dibasic acids and glycols or the functional derivatives thereof, it being possible, as required, to make conjoint use partly of an aliphatic saturated dibasic acid. As the aromatic saturated dibasic acid component, are included phthalic acid, phthalic anhydride, isophthalic acid, terephthalic acid, tetrahydrophthalic acid, halogenated phthalic anhydride and the dimethyl esters of these acids. The alpha, beta-unsaturated dibasic acid component includes maleic anhydride, maleic acid, fumaric acid, mesaconic acid, tetraconic acid, itaconic acid, calorinated maleic acid and the dimethyl esters of these acids. The glycolic component includes ethylene glycol, diethylene glycol, propylene glycol, dipropylene glycol, butylene glycol, neopentyl glycol, hexalene glycol, hydrogenated bisphenol A, 2,2'-di(4-hydroxypropoxyphenyl) propane, 2,2'-di(4-hydroxyethoxyphenyl)propane, ethylene oxide and propylene oxide. Of the acid components, the alpha, beta-unsaturated dibasic acid accounts for 50 – 100 mol percent. The presence of this acid in an amount less than this range is not desirable, since the low-shrinkage effects cannot be fully obtained.

The unsaturated polyester is synthesized by such known methods as condensation in bulk or solution, or by use of an epoxide. A molecular weight of the unsaturated polyester in the range of 1,000 – 3,000 is to be preferred. Further, an acid value of 5 – 50 and a hydroxyl value in the range of 5 – 60 is preferred.

The cross-linking unsaturated monomer to be mixed with the unsaturated polyester has no particular restrictions so long as it is one having radical copolymerizability with the unsaturated polyester. These monomers include styrene, vinyl toluene, chlorostyrene, divinylbenzene, t-butylstyrene, vinyl acetate, diallyl phthalate, the acrylic acid esters and the methacrylic acid esters, of which preferred are the styrene type unsaturated monomers. The unsaturated polyester and the cross-linking unsaturated monomer are suitably mixed in such a proportion that the content of the former is 30 – 80 percent by weight and the content of the latter is 20 – 70 percent by weight.

The polymer which is added to the unsaturated polyester resin to reduce the latter's shrinkage during its curing step is obtained by graft polymerizing a polyolefinic resins as the trunk polymer, with an unsaturated monomer having an affinity for said unsaturated polyester resin.

The terminology "an unsaturated monomer having affinity for said unsaturated polyester resin," as herein used, is meant to be an unsaturated monomer which is possible of radical polymerization or copolymerization and which can form a polymer or copolymer that is either soluble in the unsaturated polyester resin itself in or the cross-linking unsaturated monomer used in preparing the unsaturated polyester resin, or both, or is at least swellable therein. These unsaturated monomers include: styrene type unsaturated monomers such as styrene, vinyltoluene, alphamethylstyrene, chlorostyrene and t-butylstyrene; acrylic acid esters such as methyl acrylate, ethyl acrylate, propyl acrylate and butyl acrylate; methacrylic acid esters such as methyl methacrylate, ethyl methacrylate, propyl methacrylate and butyl methacrylate; vinyl esters such as vinyl formate, vinyl acetate and vinyl stearate; vinyl halides such as vinyl chloride and vinyl bromide; dienes such as 1,3-butadiene, isoprene and chloroprene, and acrylonitrile, acrylic acid and methacrylic acid; or alpha-olefins such as ethylene, propylene and butene; and their mixtures.

The polyolefinic resin used as the trunk polymer of the graft polymer in the present invention is an olefinic polymer that is insoluble in both the unsaturated polyester resin itself and the cross-linking unsaturated monomer. However, the foregoing olefinic polymer may be one which swells in either the unsaturated polyester resin or the cross-linking unsaturated monomer. In fact, such a polymer is to be preferred. The polyolefinic resin includes low and high density polyethylenes, copolymers of ethylene with other alpha-olefins, copolymers of ethylene with vinyl esters, copolymers of ethylene with vinyl chloride, copolymers of ethylene with acrylic acid esters (or methacrylic acid esters), copolymers of ethylene with acrylonitrile, chlorinated polyethylene, polypropylene, copolymers of propylene with other alpha-olefins, copolymers of propylene with various vinyl type monomers, chlorinated polypropylene and polybutene-1.

In graft polymerizing the use of a monomer to be grafted of the same class as that used for preparing the trunk polymer must be avoided. For instance, when polyethylene is used as the trunk polymer, ethylene must not be used as the monomer to be grafted.

An important feature of the unsaturated polyester resin composition resides in the point that the graft polymerized polyolefinic resin, (the polymer used for modification purposes), does not dissolve in the unsaturated polyester resin but remains dispersed therein in its undissolved powder state. This graft polymerized polyolefinic resin powder is preferably in a finely divided state in which the particle diameter is less than 1 mm, and particularly not greater than 0.5 mm. A powder of particle size greater than indicated is not desirable, since the low-shrinkage effects are not fully manifested and moreover there is a tendency for the resulting shaped article to be nonuniformly colored when molding and curing the resinous composition after blending the powder into the unsaturated polyester resin. The lower limit of the particle size is not critical. However, since exceedingly small particle sizes are difficult to prepare, the lower limit of the particle size will be prescribed by the conditions of preparation. Usually, the lower limit of the particle diameter is in the order of about 0.1 – 1.0 micron.

In graft polymerizing the unsaturated monomers or mixtures of unsaturated monomers to the polyolefinic resin powders, there is imposed no particular restriction and any of the known methods can be employed. For instance, mention can be made of such methods as: graft polymerizing a mixture of the polyolefinic resin powder and the unsaturated monomer by heating the mixture in the presence of a catalyst exposing the foregoing mixture to ultraviolet radiation in the presence of a photosensitizer; accomplishing the graft polymerization by exposing the aforesaid mixture to an ionizing radiation; or introducing graft active sites to the polyolefinic resin powder in advance by pre-exposure to ultraviolet rays or high energy radiation and thereafter contacting the polyolefinic resin powder with the unsaturated monomer. The graft polymerization reaction can be carried out in either the presence or absence of a solvent.

In carrying out the graft polymerization of the mixture of the trunk polymer and the monomer to be grafted by exposure to polymerization reaction conditions, it is usual that the reaction mixture contains, in addition to the graft polymer, a homopolymer of the monomer used for grafting. Furthermore, a part of the homopolymers being interposed among the graft polymers usually form an integrated mass with the latter by the entanglement of the molecules of the homopolymer with the molecules of the graft polymer. It is to be understood that the terminology "powder of graft polymerized polyolefinic resins," as used herein and in the appended claims, is a powder which contains among its particles the homopolymers of the monomer used for grafting, which are interposed in the graft polymer and in integration therewith.

One of the preferred embodiments of the invention is where a polyolefinic resin in which has been introduced cross-linkages is used as the trunk polymer of the graft polymer. In this case, the introduction of the cross-linkages to the polyolefinic resin may be accomplished in advance of the graft polymerization reaction or it may be carried out therewith concurrently.

The introduction of the cross-linkages can be carried out by various methods such as copolymerizing a polyfunctional monomer at the time of the polymerization of the olefin; incorporating a photosensitizer and exposure to light, or exposure to an ionizing radiation. Another useful method consists of pre-exposure of the polyolefinic resin powder to ultraviolet rays or high energy radiation to introduce simultaneously the cross-linkages and the graft active sites, after which the resin in contacted with the unsaturated monomer to effect the graft polymerization. The introduction of the cross-linkages to an extent that the melting of the graft polymer is prevented at the time of the molding and curing of the resinous composition will suffice. An extent of cross-linking in which the whole of the powder will form a three-dimensional structure (i.e., the introduction of about one cross-link per each high molecule) is sufficient. Low-shrinkage effects will not be fully demonstrated if the extent of cross-linking is too great.

When using as the trunk polymer a polyolefinic resin having cross-linkages or a polyolefinic resin having little if any cross-linkages at all, the degree of graft of the monomer to be grafted, while depending upon the class of the monomer, is suitably in the range usually of 10 – 500 percent, and preferably 50 – 350 percent. When the degree of graft is less than this, the effects of the graft tend not to be readily manifested. On the other hand, when the degree of graft is too great, this also is not desirable, since the dispersion stability of the powder in the SMC or BMC suffers. The degree of graft, as here used, is a numerical value in percentage of the increase in the weight of the trunk polymer resulting from the graft polymerization. Hence, the degree of graft indicates not only the weight increase of the trunk polymer attributable strictly to the grafted portion but also the weight increase that is due to the homopolymers of the monomer used for grafting, which are present in the graft polymer.

The graft polymer powder is mixed with the unsaturated polyester resin in such a proportion that the graft polymer powder accounts for 3 – 40 percent by weight, and preferably 5 – 25 percent by weight, of the total weight of the mixture of the unsaturated polyester resin and the graft polymer powder. When the graft polymer powder is mixed in an amount less than this, the low-shrinkage effects are not fully obtained. On the other hand, when the powder is mixed in an amount in excess of this range, this also is undesirable, since properties such as strength and hardness of the cured product suffer. The mixing can be carried out in an optional manner. For instance, in the case where the graft polymerization of a monomer to a trunk polymer powder was carried out in the absence of a solvent, the resulting reaction mixture could be used as obtained by mixing it in the desired amount with the unsaturated polyester resin. In this case, the reaction mixture consists of the graft polymer powder, homopolymers of the monomer used in the grafting, and the unreacted monomer. Thus, when this reaction mixture is mixed with the unsaturated polyester resin in its as-obtained state, there is the economic advantage that the separation is obviated. The presence of a small amount of homopolymers is permissible. The presence of unreacted monomer is also permissible, since the unreacted monomer becomes a cross-linking monomer of the unreacted polyester resin.

Further, in the case of a graft polymer obtained in the form of particles such as pellets, the polymer can be first comminuted and reduced to a finely divided state and thereafter be mixed with the unsaturated polyester resin.

Well known thickeners which are usable include divalent metal oxides or hydroxides, such as magnesium oxide, magnesium hydroxide and calcium hydroxide (conjointly using, at times, calcium oxide). These thickeners are suitably used in the range of 0.2 – 10 parts per 100 parts of the mixture consisting of the unsaturated polyester resin and the graft polymer powder.

The low-shrinkage resinous mixture of the present invention may be used as obtained or it may be incorporated with fillers, curing catalysts, curing stabilizers, parting agents, colorants and ultraviolet absorbents and, after thorough mixing, be used as a preform for molding purposes. Also, it may either be impregnated into reinforced fibrous mats and reinforced fibrous laminates or be mixed with reinforcing fibers of short length and used as a premix.

Further, if desired, the low-shrinkage resinous mixture may be incorporated with a thickener in addition to the foregoing fillers, curing catalysts, curing stabilizers, parting agents, colorants and ultraviolet absorbents. Before the viscosity becomes too high with the progress of the thickening process, it may then be either impregnated into a reinforced fibrous mat or reinforced fibrous sheet, or mixed with reinforcing fibers of short length and used as a prepregmat, SMC or BMC. While glass fibers are usually used as the reinforcing fibers, polyvinyl alcohol fibers are also usable and carbon fibers. Calcium carbonate, barium sulfate and kaolin can be used as fillers. These are suitably used in the range of 50 – 200 parts per 100 parts of the mixed resin. The curing catalysts include dicumyl peroxide, t-butyl perbenzoate, di-t-butyl hydroperoxide, t-butyl peroctoate, 2,5-dimethyl-2,5-di(t-butylperoxy)hexane and 2,5-dimethylhexyl-2,5-di(peroxybenzoate). The curing stabilizers include p-benzoquinone, hydroquinone, phenanthraquinone, t-butyl catechol and mono-t-butyl hydroquinone. As the colorants, parting agents and ultraviolet absorbents, those which have been used customarily with plastics can be used.

In the case of the unsaturated polyester resin composition of the present invention, since the modifying polymer used is a powder of a graft polymer that has been obtained by using as the trunk polymer a polyolefinic resin which is insoluble in both the unsaturated polyester resin and the cross-linking monomer and by graft polymerizing this polyolefinic resin with an unsaturated monomer that possesses affinity for the unsaturated polyester resin, the affinity of such a modifying polymer for the unsaturated polyester resin is much improved over the case where an untreated polyolefinic resin (i.e., one not graft polymerized) is used as the modifying polymer. Consequently, it is possible to blend a much greater quantity of the modifying polymer. Further, since the modifying polymer used in the invention does not dissolve in the unsaturated polyester resin or the cross-linking monomer, though its swellability therein is great, the dispersed state in powder form is maintained at all times. Hence, the dispersion stability of the modifying polymer in the unsaturated polyester resin is good. In addition, nonuniformity of coloration does not take place during the curing step, and shaped articles of low shrinkage and excelling in their smoothness are provided. Further, when a polyolefinic resin having cross-linkages is used as the trunk polymer, the graft polymer added as the modifying polymer does not melt during the molding and curing step. In consequence, the phenomena of aggregation or exuding can be improved on, with the consequence that the adhesion of the composition to the mold and the occurrence of nonuniformity of coloration can be lessened.

The thickener-incorporated or thickener-nonincorporated type of low-shrinkage unsaturated polyester composition of the present invention, which uses as the modifying polymer a polyolefinic resin powder graft polymerized with an unsaturated monomer having affinity for the unsaturated polyester resin, possesses the following features:

1. Since the graft polymer powder swells in both the unsaturated polyester resin and the cross-linking monomer but does not dissolve therein, a uniformly dispersed state is maintained when it is blended in the unsaturated polyester resin. Hence, nonuniformity of coloration does not occur during the step of molding and curing the resinous composition even in the case of the thickener-incorporated type, and a uniformly colored product can be obtained.

2. Since affinity of the graft polymer powder for the unsaturated polyester resin is enhanced by the grafting, exudation of the graft polymer powder to the surface of the shaped article does not take place during the curing step even when the powder is mixed in a large quantity in the unsaturated polyester. Further, adhesion of the resinous composition to the mold also does not occur.

3. Since the swellability of the graft polymer powder is increased as compared with the untreated polyolefinic resin powder, and since it also can be incorporated in a great quantity, the low-shrinkage effects are fully manifested and shaped articles excelling in surface luster and smoothness can be obtained. There are also no such defects as the formation of fiber patterns of the glass fibers, cracks, formation of sink marks, or warping of the product.

4. When the unsaturated polyester resin composition is submitted to a thickening treatment a product having uniform dispersion can be obtained because the composition is of powdered state, with the consequence that a thickened product of uniform dispersion is obtained. Hence there is no exudation of the powder to the surface during storage. Thus, low-shrinkage prepregs. SMC and BMC which can be stably stored over long periods of time can be obtained.

5. Nonuniform coloration and adhesion to the mold do not occur in the case of the foregoing low-shrinkage prepreg, SMC or BMC during the molding and curing thereof and low-shrinkage effects are fully manifested to provide shaped articles excelling in surface luster and smoothness.

The molding and curing temperature of the invention low-shrinkage resinous composition is suitably in the range of 80° – 180°C. When a temperature lower than this is used, the low-shrinkage effects are not fully manifested.

Shaped articles excelling in surface smoothness and without the formation of sink marks, warps, cracks or the formation of fiber patterns of the glass fibers are provided by the low-shrinkage resinous composition of the invention by matched metal die molding, injection molding and transfer molding techniques. Further, the shaped articles thus obtained are beautifully and uniformly colored. Hence, the resinous composition finds wide use in such areas as electrical parts, bath tubs, building materials and automotive parts.

The following examples will more fully illustrate the invention. Unless otherwise specified, the percentages and parts are on a weight basis.

The tests mentioned in the examples were conducted in the following manner.

1. Storage stability of SMC and BMC

SMC and BMC stored for 10 days at room temperature after their preparation were evaluated in accordance with the following criteria.

| Condition of SMC or BMC | Rating of stability |
|---|---|
| No exudation of the thermoplastic resin to the surface of SMC or BMC and no tackiness. No adhesion of the thermoplastic resin to the mold when the SMC or BMC is molded. | ◉ |
| Slight exudation of the thermoplastic resin to the surface, as well as little tackiness. When SMC or BMC is molded, there is slight adhesion of the thermoplastic resin to the mold. | △ |
| Thermoplastic resin exudes to the surface and SMC or BMC is excessively tacky. When molded, there is much adhesion of the thermoplastic resin to the mold. | X |

2. Surface smoothness

The surface smoothness was determined with a Microcorder. The surface smoothness is indicated in μin/in; the smaller the value, the greater the smoothness of the surface.

3. Strength and hardness

The strength and hardness of the resulting shaped articles were measured and compared, the following ratings being awarded.

Excellent............................................................. ◉
Good.................................................................. △
Inferior.............................................................. X 4. Nonuniformity of coloration The resulting shaped articles were judged with the naked eye, and the following ratings were awarded. Complete absence of nonuniform coloration Complete absence of nonuniform coloration................ ◉
Hardly any nonuniform coloration............................ O
Slight presence of nonuniform coloration.................. △
Presence of nonuniform coloration............................ X 5. Adhesion of resin to mold The resulting shaped articles were judged with the naked eye, and the following ratings were awarded.

Complete absence of adhesion of resin to mold............ ◉
Hardly any adhesion of resin to mold......................... O
Slight adhesion of resin to mold................................ △
Adhesion of resin to mold......................................... X

EXAMPLES 1 – 4

1. Synthesis of the unsaturated polyester resin

The condensation reaction of 73.3 parts of maleic anhydride, 37.1 parts of phthalic anhydride and 79.9 parts of propylene glycol was carried out by heating this mixture in a stream of nitrogen at 215°C. until an acid value of 42 was achieved (maleic anhydride accounted for 75 mol percent of the acid component). The hydroxyl value was 19. 50 parts of this unsaturated polyester was dissolved in 50 parts of styrene.

2. Synthesis of the cross-linkage containing polyethylene powder graft polymerized with styrene.

An aqueous dispersion of styrene monomer was prepared by mixing 200 parts of water, 3 parts of an anionic surfactant and 120 parts of styrene. 100 parts of low density polyethylene powder (passing 100 mesh) was exposed in a nitrogen atmosphere to a high energy electron beam at a dosage of 4 Mrad, after which the exposed powder was added to the foregoing aqueous dispersion of styrene monomer followed by purging the system with nitrogen and stirring the mixture for 2 hours at room temperature. After completion of the reaction, the powder was separated by filtration, water-washed, washed in methanol and thereafter dried under reduced pressure at 50°C. to obtain 210 parts of a polyethylene powder graft polymerized with styrene. The degree of graft was 110 percent. Further, when the insoluble portion of the polyethylene powder exposed to 4 Mrad of high energy radiation was determined by heating the so exposed powder in decalin to elute the soluble portion, the insoluble portion was found to be 65 percent. It is thus seen that the polyethylene powder has been introduced with cross-linkages.

3. Preparation of the resinous composition.

The unsaturated polyester resin synthesized in (1), above, and the cross-linkage containing polyethylene powder graft polymerized with styrene, which was synthesized in (2), above, were mixed in a proportion indicated in Table 1. To 242 parts of the resulting liquid resinous mixture was then thoroughly admixed 0.15 part of t-butyl catechol, 1.5 parts of t-butyl perbenzoate, 145 parts of kaolin clay, 36 parts of talc, 4.5 parts of zinc stearate, 10 parts of titanium white, 5 parts of quinacridone red and 2 parts of magnesium oxide (thickener). The so obtained composition was then impregnated into 130 parts of a glass fiber mat, and the thickening was caused to proceed by allowing the impregnated mat to stand for 10 days at room temperature. Thus was obtained a SMC devoid of tackiness. This SMC was compression molded at 150°C. and 200 kg/cm², using a deep-drawn mold. The properties of the SMC and the shaped article are shown in Table 1.

TABLE 1

| Example | UPER synthesized in (1), parts | Cross-linkage containing styrene grafted polyethylene powder synthesized in (2), parts | Stability of SMC | Properties of shaped article | | | | |
|---|---|---|---|---|---|---|---|---|
| | | | | Strength | Hardness | Surface smoothness | Non-uniform coloration | Adhesion to mold |
| 1 | 95 | 5 | O | ◉ | ◉ | 110 | ◉ | ◉ |
| 2 | 90 | 10 | O | ◉ | ◉ | 100 | ◉ | ◉ |
| 3 | 85 | 15 | O | ◉ | ◉ | 100 | ◉ | ◉ |
| 4 | 80 | 20 | O | ◉ | ◉ | 100 | ◉ | ◉ |

As controls, SMC's were prepared in a similar manner with the compositions shown in Table 2, using untreated low density polyethylene powder and a styrene great polymerized powder containing practically no cross-linkages (degree of graft 110 percent). The so obtained compositions were then compression molded and tested. The case where the graft polymerized powder containing practically no cross-linkages was used is seen to be somewhat inferior with respect to the properties of nonuniformity of coloration and adhesion to the mold than the case where the graft polymerized powder containing cross-linkages was used. When the untreated polyethylene powder was used, the resulting product was greatly inferior in respect of its surface smoothness, nonuniformity of coloration and adhesion to mold.

Further, similar results were obtained as in the case with the SMC when the foregoing several resinous mixtures, after mixing without using the magnesium oxide, were immediately molded along with 130 parts of glass fiber preform using a deep-drawn mold.

EXAMPLES 5 – 9

A low density polyethylene powder (passing 100 mesh) was exposed severally to 2, 3, 4, 5 and 6 Mrad of electron rays and then graft polymerized as in Examples 1 – 4 with styrene to obtain in each instance a graft resin of a degree of graft of practically 100 percent by varying the polymerization time.

When the insoluble portion of the polyethylene powder exposed to electron rays was determined by heating the powder in decalin, the results shown in Table 3 were obtained.

Table 3

| Radiation dosage (Mrad) | Proportion of insoluble portion (%) |
|---|---|
| 2 | 18 |
| 3 | 40 |
| 4 | 65 |
| 5 | above 80 |
| 6 | above 80 |

It is thus seen that in proportion as the radiation dosage becomes greater the insoluble portion increases, thus indicating the introduction of cross-linkages.

15 parts of each the foregoing graft resins were mixed with 85 parts of the unsaturated polyester resin ) synthesized in (1) of Examples 1 – 4. A SMC was prepared by compounding as in (3) of Examples 1 – 4 the components indicated therein with 242 parts of each of the these liquid resinous mixtures.

The so obtained SMC was compression molded at 150°C. and 200 kg/cm², using a deep-drawn mold. The properties of the SMC and the resulting shaped article are shown in Table 4.

As apparent from the foregoing results, optimum results are obtained when the graft powder used is one which contains cross-linkages to a suitable degree.

TABLE 2

| Control | UPER synthesized in (1) | Powder | Stability of SMC | Strength | Hardness | Surface smoothness | Nonuniform coloration | Adhesion to mold |
|---|---|---|---|---|---|---|---|---|
| 1 | 85 parts | Untreated powder, 15 parts | ○ | ○ | ○ | 1,000 | △ | △ |
| 2 | do | Styrene grafted powder, 15 parts | ○ | ○ | ○ | 130 | ○ | ○ |

TABLE 4

| Example | Radiation dosage (Mrad) | Stability of SMC | Strength | Hardness | Surface smoothness | Nonuniform coloration | Adhesion to mold |
|---|---|---|---|---|---|---|---|
| 5 | 2 | ○ | ○ | ○ | 130 | ○ | ○ |
| 6 | 3 | ○ | ○ | ○ | 105 | ◎ | ◎ |
| 7 | 4 | ○ | ○ | ○ | 100 | ◎ | ◎ |
| 8 | 5 | ○ | ○ | ○ | 105 | ◎ | ◎ |
| 9 | 6 | ○ | ○ | ○ | 110 | ◎ | ◎ |

EXAMPLES 10 – 17

100 parts of the same low density polyethylene powder as used in Examples 1 – 4 was exposed to 4 Mrad of electron rays in a nitrogen atmosphere, after which the so exposed powder was immediately added in a nitrogen atmosphere to unsaturated monomers of a composition indicated in Table 5 and stirred for 2 hours at room temperature. After completion of the reaction, the product was treated as in Examples 1 – 4 to obtain a graft polyethylene powder. A liquid resinous mixture consisting of 15 parts of the so obtained powder and 85 parts of the unsaturated polyester resin synthesized in (1) of Examples 1 – 4 was treated as in Examples 1 – 4 to prepare a SMC, which was then compression molded and tested.

The test results in each case are shown in Table 5.

From the foregoing results, the effects of the use of a cross-linkage containing polyethylene powder graft polymerized with either a styrene-acrylonitrile unsaturated monomer mixture, a styrene-methyl methacrylate unsaturated monomer mixture, chlorostyrene or chloroprene are apparent.

TABLE 5

| Example | Grafted unsaturated monomer | Mixture wt. ratio | Degree of graft, percent | Stability of SMC | Hardness | Strength | Non-Surface smoothness | uniform coloration | Adhesion to mold |
|---------|---------------------------|-------------------|-------------------------|------------------|----------|----------|------------------------|--------------------|------------------|
| 10 | Styrene / Acrylonitrile | 75 / 25 | 130 | ○ | ○ | ○ | 130 | ◎ | ◎ |
| 11 | Styrene / Acrylonitrile | 50 / 50 | 150 | ○ | ○ | ○ | 150 | ◎ | ◎ |
| 12 | Styrene / Acrylonitrile | 25 / 75 | 120 | ○ | ○ | ○ | 160 | ◎ | ◎ |
| 13 | Styrene / Methyl methacrylate | 75 / 25 | 150 | ○ | ○ | ○ | 120 | ◎ | ◎ |
| 14 | Styrene / Methyl methacrylate | 50 / 50 | 170 | ○ | ○ | ○ | 110 | ◎ | ◎ |
| 15 | Styrene / Methyl methacrylate | 25 / 75 | 130 | ○ | ○ | ○ | 130 | ◎ | ◎ |
| 16 | Chlorostyrene | | 190 | ○ | ○ | ○ | 100 | ◎ | ◎ |
| 17 | Chloroprene | 100 | | ○ | ○ | ○ | 140 | ◎ | ◎ |

EXAMPLE 18

100 parts of an ethylene-vinyl acetate copolymer (vinyl acetate content 15 percent) powder (passing 100 mesh) was exposed in a nitrogen atmosphere to 4 Mrad of electron rays (the insoluble portion being 75 percent by weight when heated in toluene), after which the so exposed powder was immediately added to 500 parts of styrene in a nitrogen atmosphere and stirred for 1 hour at room temperature. After completion of the reaction, the product was treated as in Examples 1 - 4 to obtain a powder whose degree of graft was 80 percent. SMC was prepared from a liquid resinous mixture of 15 parts of the so obtained powder and 85 parts of the unsaturated polyester resin synthesized as in (1) of Examples 1 - 4 by treating as in Examples 1 - 4, following which this was compression molded and tested. The stability rating of the SMC was ○, and the hardness and strength ratings of the shaped article were ○, while the nonuniformity of coloration and adhesion to mold properties were both rated ◎, and the surface smoothness had a rating of 100 μin/in.

On the other hand, when a styrene grafted ethylene-vinyl acetate copolymer containing practically no cross-linkages was used, the nonuniformity of coloration and adhesion to mold properties were somewhat inferior than the case described above, while in the case where an untreated ethylene-vinyl acetate copolymer was used, the properties such as nonuniformity of coloration, adhesion to mold and surface smoothness were greatly inferior.

EXAMPLE 19

1. Synthesis of an isophthalic acid type unsaturated polyester resin.

41.6 Parts of isophthalic acid, 73.5 parts of maleic anhydride and 79.9 parts of propylene glycol were reacted as in (1) of Examples 1 - 4, and an unsaturated polyester resin having an acid value of 42 was obtained (maleic anhydride accounting for 75 mol percent of the acid component). 50 parts of this unsaturated polyester was dissolved in 50 parts of styrene.

2. Synthesis of a bisphenol type unsaturated polyester resin.

98.1 Parts of maleic anhydride and 236 parts of hydrogenated bisphenol A were reacted as in (1) of Examples 1 - 4 to obtain an unsaturated polyester having an acid value of 40 (maleic anhydride accounting for 100 mol percent of the acid component). 50 parts of this unsaturated polyester was dissolved in 50 parts of styrene.

3. Preparation of the resinous compositions and SMC's and the compression molding test.

A liquid resinous mixture consisting of 15 parts of the cross-linkage containing low density polyethylene powder graft polymerized with styrene, synthesized in (2) of Examples 1 - 4, and 85 parts of the unsaturated polyester resin synthesized in either (1) or (2) of this example was treated as in Examples 1 - 4 to thereby prepare a SMC, which was then compression molded and tested. The stability of SMC obtained had in each case a rating of ○, and the shaped article obtained in both cases had hardness and strength ratings of ○ and nonuniformity of coloration and adhesion to mold ratings of ◎, while the surface smoothness rating of the isophthalic acid type was 110 μin/in and that of the bisphenol type was 100 μin/in.

In contrast, when a graft powder containing practically no cross-linkages was used, the nonuniformity of coloration and adhesion to mold properties were somewhat inferior than the case where the graft powder used contained cross-linkages. On the other hand, when an unsaturated low density polyethylene powder was used, the properties such as nonuniformity of coloration, adhesion to mold and surface smoothness were greatly inferior.

EXAMPLE 20

40 parts of a low density polyethylene powder passing 300 mesh was added to 200 parts of water containing 1.0 percent of sodium dodecyl alcohol sulfate and stirred until the polyethylene powder was dispersed in a slurry state. This was followed by the addition incrementally of 45 parts of a liquid mixture of 50 percent styrene and 50 percent acrylonitrile co containing 1.0 percent of benzoyl peroxide, with stirring. This liquid suspension was stirred for 8 hours while being held at 70°C. in a nitrogen atmosphere. After completion of the reaction, the reaction product was filtered with a Toyo filter paper No. 5A, and the matter not passing the filter paper was washed with water and then methanol followed by drying at 70°C. for 24 hours under reduced pressure. The degree of graft was 99 percent. This graft polyethylene contained practically no cross-linkages. When this was comminuted for 3 minutes with a mixer for domestic use, 98.6 percent thereof passed a 100-mesh screen.

A liquid resinous mixture consisting of 15 parts of the foregoing powder and 85 parts of the unsaturated polyester resin synthesized in (1) of Examples 1 - 4 was treated as in the aforesaid Examples 1 - 4 to prepare a SMC, which was then passed and tested. The results obtained were as follows: stability rating of SMC, ○, hardness and strength ratings of the shaped article, ○, nonuniformity of coloration and adhesion to mold ratings, both ◎, surface smoothness rating, 130 μin/in. Although the graft polyethylene used in this example contained practically no cross-linkages, it is seen that the properties of the resulting resinous composition were excellent.

EXAMPLES 21 – 24

Combinations of finely divided polyolefins of varied classes passing 300 mesh and radically polymerizable monomers of varied classes were treated as in Example 20, and graft polymers passing 100 mesh were obtained. All of these graft polymers contain practically no cross-linkages. Liquid resinous mixtures of 15 parts of each of these polymer powders and 85 parts of the unsaturated polyester resin synthesized in (1) of Examples 1 – 4 were treated as in the aforesaid Examples 1 – 4 to prepare SMC's, which were then pressed and tested, with the results shown in Table 6. As is apparent from the experimental results given in the foregoing table, resinous composition possessing properties of considerable excellence can be provided even in the case where the graft polymers are those containing practically no cross-linkages.

unsaturated polyester of a polycarboxylic acid dissolved in a cross-linking unsaturated monomer having radical copolymerizability with the unsaturated alkyd resin, and dispersed therein a powder of a polyolefinic resin graft polymerized with an unsaturated monomer capable of radical polymerication or copolymerization and of forming a polymer that is soluble or swellable in either or both components of the unsaturated polyester resin.

2. A resinous composition according to claim 1 wherein the unsaturated polyester resin composition contains, in addition, a thickener.

3. A resinous composition according to claim 1 wherein said polyolefinic resin contains cross-linkages.

4. A resinous composition according to claim 1 wherein the unsaturated polyester resin is present in an amount of from 60 to 97 percent by weight based on the total amount of the unsaturated polyester resin and polyolefinic resin powder.

5. A resinous composition according to claim 1 wherein the degree of grafting of said polyolefinic resin is from 10 to 500 percent.

TABLE 6

| Example | Finely divided polyolefine | Unsaturated monomer used for grafting | Mixture wt. ratio | Degree of graft, percent | Percent passing 100 mesh | Stability of SMC | Properties of shaped article | | | | |
|---|---|---|---|---|---|---|---|---|---|---|---|
| | | | | | | | Strength | Hardness | Surface smoothness | Non-uniform coloration | Adhesion to mold |
| 21 | Low density polyethylene. | Methyl methacrylate | | 102 | 99.1 | ○ | ○ | ○ | 105 | ◎ | ◎ |
| 22 | High density polyethylene. | Acrylonitrile | | 105 | 100.0 | ○ | ○ | ○ | 145 | ◎ | ◎ |
| 23 | Low density polyethylene. | {Styrene / Acrylonitrile} | {70 / 30} | 101 | 99.2 | ○ | ○ | ○ | 135 | ◎ | ◎ |
| 24 | Polybutene-1 | Chlorostyrene | | 101 | 99.0 | ○ | ○ | ○ | 120 | ◎ | ◎ |

What is claimed is:

1. A low-shrinkage unsaturated polyester resin composition comprising an unsaturated polyester resin consisting of the uncured mixture of an essentially linear 6. A resinous composition according to claim 5 wherein the degree of grafting is from 50 to 350 percent.

* * * * *